(12) United States Patent  
Kristiansen et al.

(10) Patent No.: US 8,526,879 B2  
(45) Date of Patent: Sep. 3, 2013

(54) WIRELESS COMMUNICATION DEVICE FOR INDUCTIVE COUPLING TO ANOTHER DEVICE

(75) Inventors: Niels Kristian Kristiansen, Solbjerg (DK); Sune Pelle Borregaard, Smorum (DK); Torkil Filholm, Dyssegard (DK)

(73) Assignee: Oticon A/S, Smorum (DK)

(*) Notice: Subject to any disclaimer, the term of this patent is extended or adjusted under 35 U.S.C. 154(b) by 579 days.

(21) Appl. No.: 12/594,104

(22) PCT Filed: Apr. 11, 2008

(86) PCT No.: PCT/EP2008/002878  
§ 371 (c)(1), (2), (4) Date: Sep. 30, 2009

(87) PCT Pub. No.: WO2008/125291  
PCT Pub. Date: Oct. 23, 2008

(65) Prior Publication Data  
US 2010/0136905 A1   Jun. 3, 2010

(30) Foreign Application Priority Data  
Apr. 11, 2007   (EP) .................................... 07105946

(51) Int. Cl.  
*H04B 5/00*   (2006.01)

(52) U.S. Cl.  
USPC ...... 455/41.1; 455/41.2; 455/455; 455/556.1; 455/575.5; 455/100; 455/95; 340/5.64; 340/825.72; 360/99.07; 360/99.08

(58) Field of Classification Search  
USPC ............... 455/41.1, 41.2, 556.1, 575.5, 100, 455/95; 340/5.64, 825.72; 360/99.07, 99.08  
See application file for complete search history.

(56) References Cited

U.S. PATENT DOCUMENTS 5,740,257 A * 4/1998 Marcus ..................... 381/71.6  
5,982,764 A * 11/1999 Palermo et al. ............ 370/345  
(Continued)

FOREIGN PATENT DOCUMENTS

EP   0 789 474 A2   8/1997  
EP   1 460 769 A1   9/2004  
(Continued)

OTHER PUBLICATIONS

Form PCT/ISA/210—International Search Report for PCT/EP2008/002878.

(Continued)

*Primary Examiner* — Marceau Milord  
(74) *Attorney, Agent, or Firm* — Buchanan Ingersoll & Rooney PC

(57) ABSTRACT

A communications device for wireless communication with another device, the communications device having a) a first part having a first housing and a first induction coil for providing an inductive coupling to the other device, and b) a second part having a second induction coil adapted to be inductively coupled to said first induction coil and to said other device when mounted on or near said first housing. Provided is a relatively simple mechanical interface for an inductively coupled link between a communications device and another device. The second part is adapted to be detachably attachable to the first housing. An advantage is that no connector is needed whereby a simpler and more reliable device is provided. The consequences of wear of the connector leading to increased contact resistance and/or failure of the electrical connection is avoided.

23 Claims, 11 Drawing Sheets

(56) References Cited

U.S. PATENT DOCUMENTS

| | | | |
|---|---|---|---|
| 6,424,820 B1 * | 7/2002 | Burdick et al. | 455/41.1 |
| 6,516,075 B1 * | 2/2003 | Jacobs et al. | 381/331 |
| 6,594,370 B1 * | 7/2003 | Anderson | 381/315 |
| 6,694,034 B2 * | 2/2004 | Julstrom et al. | 381/315 |
| 6,754,472 B1 * | 6/2004 | Williams et al. | 455/100 |
| 6,864,780 B2 * | 3/2005 | Doi et al. | 340/5.64 |
| 6,940,466 B2 * | 9/2005 | Terry | 343/841 |
| 7,015,859 B2 * | 3/2006 | Anderson | 342/450 |
| 7,062,223 B2 * | 6/2006 | Gerber et al. | 455/3.06 |
| 7,099,486 B2 * | 8/2006 | Julstrom et al. | 381/331 |
| 7,127,078 B2 * | 10/2006 | Mann et al. | 381/326 |
| 7,206,426 B1 * | 4/2007 | Julstrom et al. | 381/331 |
| 7,236,751 B2 * | 6/2007 | Ono | 455/90.3 |
| 7,277,553 B2 * | 10/2007 | Reithinger | 381/315 |
| 7,447,325 B2 * | 11/2008 | Bren et al. | 381/331 |
| 7,512,383 B2 * | 3/2009 | Essabar et al. | 455/78 |
| 7,522,740 B2 * | 4/2009 | Julstrom et al. | 381/331 |
| 7,561,711 B2 * | 7/2009 | Hawker et al. | 381/331 |
| 7,668,122 B2 * | 2/2010 | Sung et al. | 370/280 |
| 7,933,554 B2 * | 4/2011 | Hoyt et al. | 455/41.2 |
| 8,142,344 B2 * | 3/2012 | Slattery et al. | 600/25 |
| 2004/0240692 A1 * | 12/2004 | Julstrom | 381/315 |
| 2005/0244022 A1 | 11/2005 | Muthuswamy et al. | |
| 2006/0039577 A1 | 2/2006 | Sanguino et al. | |
| 2007/0064963 A1 | 3/2007 | Hawker et al. | |
| 2009/0047994 A1 * | 2/2009 | Sommer et al. | 455/556.1 |

FOREIGN PATENT DOCUMENTS

| | | |
|---|---|---|
| EP | 1 480 492 A2 | 11/2004 |
| WO | WO 98/25439 | 6/1998 |
| WO | WO 2005/053179 | 6/2005 |
| WO | WO 2005/055654 | 6/2005 |
| WO | WO 2006/117365 A1 | 11/2006 |

OTHER PUBLICATIONS

Form PCT/ISA/237—Written Opinion of the International Searching Authority for PCT/EP2008/002878.
European Search Report for EP 07105946.3.

* cited by examiner

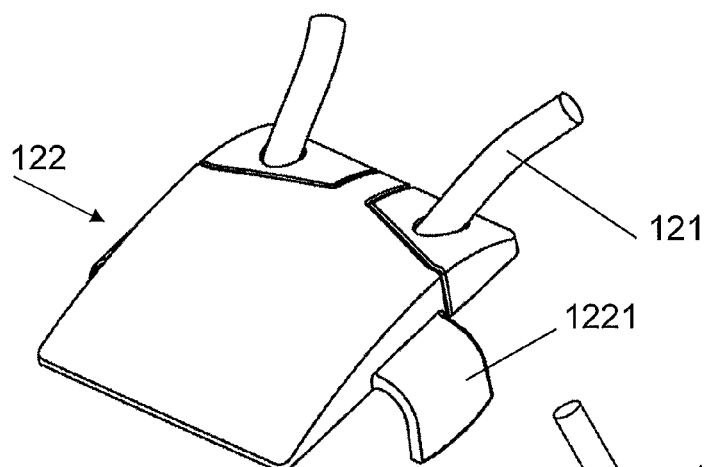
FIG. 3a
FIG. 3b
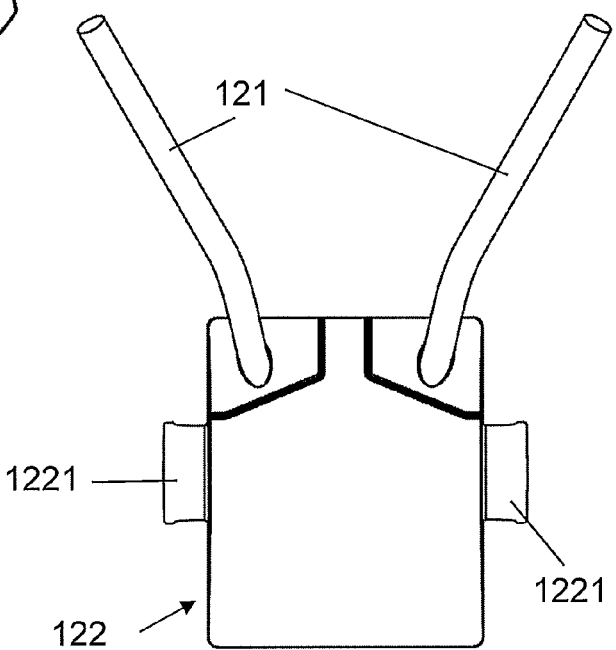
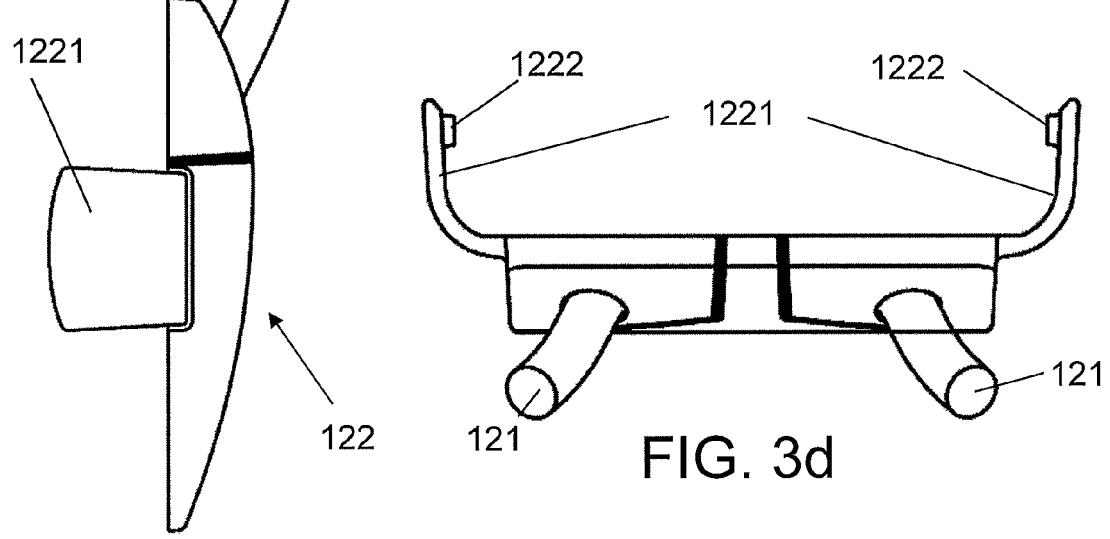
FIG. 3c
FIG. 3d

WIRELESS COMMUNICATION DEVICE FOR INDUCTIVE COUPLING TO ANOTHER DEVICE

CROSS REFERENCE TO RELATED APPLICATIONS

The present application is a national stage application of PCT/EP2008/002878, filed on 11 Apr. 2008, which claims priority to EP 07105946.3, filed on 11 Apr. 2007, which hereby expressly incorporated by reference.

TECHNICAL FIELD

The disclosure relates to a communications device for wireless communication with another device. An embodiment of the present disclosure relates to an intermediate antenna for wirelessly transmitting audio or data signals to a hearing aid. Embodiments of the disclosure may e.g. be useful in applications for the provision of an audio signal selected among a number of audio signals (e.g. including that of a mobile telephone) to a head-worn listening device, e.g. a hearing aid.

BACKGROUND ART

The following account of the art relates to one of the areas of application of the present disclosure, the forwarding of audio signals to a hearing aid.

Hearing aid systems demand increasing ability to communicate with accessories such as mobile phones, MP3 players, etc. Inductive communication (i.e. communication based on electromagnetic induction as opposed to electromagnetic radiation) between a hearing aid and a mobile telephone or a gateway device capable for converting these types of data in accordance with a standard or proprietary protocol has been proposed, cf. e.g. EP 1 480 492 A2.

US 2006/0039577 discloses a system comprising a wireless transceiver for enabling a hearing assistance device to communicate with other wireless devices. The wireless transceiver comprises a neck loop integrated with an antenna adapted to communicate with the near field antenna of the hearing assistance device. The neck loop antenna is connected to the wireless transceiver by one or more jack connectors.

EP 0 789 474 A2 discloses a hands-free arrangement for enabling communication between an earphone, e.g. a hearing aid, and a mobile communications device. The arrangement includes an induction loop to be worn around the neck, a microphone integrated with the induction loop and a cord with a connector which connects the microphone and induction loop to the mobile communication device.

US 2004/240692 describes an adaptor for use with a mobile cellular telephone, to improve inductive communication from the coil of a speaker of the mobile to the telecoil of a hearing aid.

US 2005/0244022 describes a removable bezel for use with an audio device, e.g. a mobile telephone, to enhance operation with a hearing aid. The removable bezel has an electromagnetic coil that is coupled to the audio output of the audio device. The electromagnetic coil is either inductively coupled to an acoustic transducer within the audio device or by a direct electrical connection. The electromagnetic coil provides an enhanced magnetic field to a telecoil within the hearing aids.

OBJECTS AND SUMMARY

The problem of the art is that the solutions provided for inductively coupled links between a communications device (e.g. a mobile telephone) and another device (e.g. a hearing aid) are relatively complex and require mechanically vulnerable interfaces.

An object of the present disclosure is to provide a relatively simple mechanical interface for an inductively coupled link between a communications device and another device.

The objects of the disclosure are achieved by the inventions described in the accompanying claims and as described in the following.

In an embodiment, the present disclosure relates to connecting an external antenna, such as a neck loop antenna for a hearing aid system, to a gateway device without the use of a wired connection in the form of an electro-mechanical connector or the like.

An object of the disclosure is achieved by a communications device for wireless communication with another device, the communications device comprising a) a first part comprising a first housing and a first induction coil for providing an inductive coupling to the other device, and b) a second part comprising a second induction coil adapted to be inductively coupled to said first induction coil and to said other device when mounted on or near said first housing. Advantageously, said second part is adapted to be detachably attachable to said first housing.

An advantage is that no connector is needed whereby a simpler and more reliable device is provided. The consequences of wear of the connector leading to increased contact resistance and/or failure of the electrical connection is avoided. The wirelessly connected external antenna may avoid some of the disadvantages of wired solutions such as Reliability issues of electromechanical connectors Wear of the electromechanical connector Embodiments of the disclosure further provide:

More free and simple mechanical design

Simpler electrical circuit

Galvanic separation

The term 'inductively coupled' is in the present context taken to mean that the mutual induction between the two inductance coils in question is larger than 1% of the inductance of the coil having the smallest inductance of the two coils, such as larger than 5%, such as larger than 10%, such as larger than 20%, such as larger than 50%. In an embodiment, the coupling coefficient between the first and second induction coils is larger than 0.05, such as larger than 0.15, such as larger than 0.25.

The first and second induction coils (each coil comprising an electrical conductor) are spaced apart, i.e. no part of a conductor of the first coil is in direct physical (and thus electrical) contact with a part of a conductor of the second coil). The term 'near said housing' is in the present context taken to mean less than 1 m from, such as less than 50 cm from, such as less than 20 cm from, such as less than 5 cm from, such as less than 1 cm from. In an embodiment, a wall of the housing of the first part and/or of the second part separate(s) the first and second coils. In an embodiment, the wall of the housing separating the first and second inductive coils is made of a material that is adapted to let the magnetic flux from the first induction coil through without substantial loss. In an embodiment, the wall material is an essentially dielectric material. In an embodiment, the wall material is a plastic material.

The first and second parts are distinct separate parts that only cooperate electromagnetically via the inductive connection between them. No wired connections (or connectors) exist between the two parts. The first part is adapted to communicate directly (inductively) with the other device without involving the second part, in case of sufficient coupling between the first induction coil and the other device (comprising an appropriate antenna, e.g. an inductive coil).

An advantage is that no connector is needed for the coupling between the first and second parts, whereby a simpler and more reliable device is provided. The consequences of wear of the connector leading to increased contact resistance and/or failure of the electrical connection is avoided.

In an embodiment, the second part comprises a tuning circuit for adapting the second induction coil to a specific preferred frequency range.

In an embodiment, the second part consists essentially of a second induction coil. In an embodiment, the second part consists essentially of a second induction coil and a safety release member (optionally comprising a tuning circuit).

In an embodiment the first part is adapted to engage with the second induction coil (or the second part or an attachment member of the second part), e.g. via one or more grips or hooks or pinching profiles or the like protruding from or indented in and appropriately positioned on the housing of the first part and adapted to provide a good coupling between the first and the second coil, when the second coil (or the second part or an attachment member whereto the second coil is attached) is mounted in the grips or hooks or pinching profiles or the like (so that the second coil or part can be releasably mounted in the grips or hooks or pinching profiles or the like).

In an embodiment, the first part comprises an attachment member for attaching the second part to the housing of the first part.

In general the second part can be attached to the first part in any appropriate way leading to a reasonable coupling between the first and second coils and which provides a relatively easy attachment and detachment of the two parts. In an embodiment, the second part is attached to the first housing by a string or an elastic member e.g. an elastic tape or band. In an embodiment, the second part is attached to the first housing by tapes of cooperating hook and loop fasteners (such as e.g. Velcro™ tape) or some other means (e.g. elastic 'click on' members) allowing an easy attachment and detachment to be performed.

In an embodiment, the second part comprises an attachment member to which at least a part of the second induction coil is attached (either fixed or detachable), the attachment member being detachably attachable to the first housing. Detachment (or release) can e.g. be dependent on an activator (such as a mechanical activator). In an embodiment, no activator is necessary to release the attachment member. In an embodiment, the attachment member is adapted to be 'clicked on' to the housing of the first part. In an embodiment, the attachment member and the housing of the first part comprises one or more protruding members on the one part (e.g. grips or hooks or pinching profiles) adapted to engage with one or more cooperating indentations on the other part. In an embodiment, the attachment member can be detached from the first part simply by twisting the attachment member relative to the housing of the first part.

In an embodiment, the mutual induction between the first and second induction coils can be modified (i.e. is (reversibly) adjustable) whereby the quality of the inductive communication between the first part and the second part and thereby between the first part and the other device can be modified, e.g. optimized to a given situation. In an embodiment, this is simply achieved by changing the length (and/or the form) of the part of the second induction coil located near the housing (and thus the first induction coil) of the first part. In an embodiment, the second part (e.g. an attachment member thereof) can be slidably moved along the length of the housing of the first part, thereby modifying the amount of magnetic flux entering the second coil from the first coil and/or the 'effective length' of the neck strap constituted by the loop antenna. In an embodiment, the attachment member has several possible positions along the first part whereto it can be detachably attached.

In an embodiment, the first part is part of a mobile telephone (specifically adapted), such as a DECT-telephone or such as a telephone connected to a switched telecommunications network, e.g. a GSM-telephone.

In an embodiment, the first part is a portable communications device, such as an audio selection device in the form of a portable, body-worn communications device for wireless audio and data transmission to a head-worn listening device, e.g. a hearing aid. In an embodiment, the communications device comprises a microphone, e.g. for picking up the voice of a user of the other device, e.g. a hearing aid. In an embodiment, the microphone is located on the first part of the communications device. Alternatively, the microphone could be located on the second part, e.g. located on the second induction coil or on an attachment member. In an embodiment, the first part is adapted for communicating with other devices providing an audio input (wired or wirelessly, e.g. according to the BlueTooth standard), including with a mobile telephone. Examples of such devices are e.g. described in EP 1 460 769 A1 and WO 2006/117365 A1.

In the present context, a hearing aid (also termed a hearing instrument) may be of any appropriate kind, such as an in-the-ear (ITE), such as an in-the-canal (ITC), such as a completely-in-canal (CIC), such as a behind-the-ear (BTE), or such as a receiver-in-the-ear (RITE) hearing aid.

In an embodiment, the second induction coil is in the form of a closed loop comprising one or more turns, such as 1 or 2 or 3 or 4 or 5-10 or more than 10 turns. Increasing the number of turns has the advantage of increasing the magnetic field, whereby a more robust communication can be established.

The first induction coil, which is the exciting coil providing (or rather relaying) the signal to be communicated to the other device, can in general be of any kind and size appropriate for the application (dimensions, frequency, etc.). The first induction coil is coupled to transmitter circuitry for generating the signal to be communicated to the other device.

In an embodiment, the first induction coil is adapted, such as solely tailored, to communicate inductively with the other device. Preferably, the first induction coil and the transmitter circuitry to which it is connected is specifically adapted to communicate directly (inductively) with the other device (i.e. without involving the second induction coil). The adaptation relates to design properties such as the intended range of communication (power consumption), frequency range, dimensions, number of turns and orientation of the first induction coil relative to the other device when located in an operational condition. Typically, the only task of the first induction coil is (together with transmitter circuitry) to generate the magnetic field that forms basis of the inductive coupling to the other device directly or via the second inductive coil (i.e. the first inductive coil does not form part of another circuit or component, additionally having another purpose).

In an embodiment, the first induction coil comprises a core of a (magnetically) soft magnetic material (such as a core comprising iron and/or nickel, e.g. an iron alloy or a ceramic material, such as a ferrite material).

In an embodiment, the first coil is adapted for inductively transmitting an electrical signal (e.g. comprising an audio signal) to the other device. In an embodiment, the first and second coils are adapted to communicate with a near field antenna (e.g. a coil, optionally comprising a core of a magnetic material) of the other device.

In an embodiment, the second part comprising the second induction coil is adapted to improve the signal quality of the inductive communication between the first part of the communications device and the other device.

In an embodiment, the inductive coupling between the communications device and the other device is optimized to a predefined frequency range, e.g. by adapting the loop length, the number of turns, the values of a capacitor and/or a resistor of a resonance circuit formed by the coil, the capacitor and/or the resistor to provide a specific preferred frequency range for the inductive communication. Such optimization is preferably performed for each of the coil circuits of the involved devices (including the first and second coils and an antenna of the other device). The communication between the communications device and the other device may in principle be in any frequency range, e.g. in an audio frequency range (e.g. between DC and 20 kHz) or in the RF-range. In an embodiment, the communications device and the other device is adapted to inductive communication at audio frequencies (e.g. between 20 Hz and 8 kHz). In an embodiment, the preferred range is in the MHz-range (e.g. in the range between 1 MHz and 30 MHz or between 10 MHz and 100 MHz). In an embodiment, the tuning circuit is a parallel coupling of the induction coil and a resistor and/or a capacitor. In an embodiment, the second part comprises a tuning circuit for the second induction coil, the tuning circuit e.g. comprising a resistor and/or a capacitor. In an embodiment, the second part comprises a printed circuit board (PCB) whereon at least some of the tuning component(s), e.g. a resistor and/or a capacitor, of a tuning circuit for the second inductive coil is/are mounted. In an embodiment, the attachment member of the second part comprises the PCB with the tuning component(s). In an embodiment, the tuning circuit for the second induction coil comprises a capacitor of 68 pF, a resistor of 6.8 kΩ and an inductance comprising 4 turns of wire each of a length of 85 cm, providing a resonance frequency around 3.84 MHz.

In an embodiment, the other device is adapted to be body-worn. In an embodiment, the other device is adapted to be head-worn. In an embodiment, the other device is a hearing aid or a head set or a pair of head phones. WO 2005/055654 and WO 2005/053179 describe various aspects of a hearing aid comprising an induction coil for inductive communication with other units.

In an embodiment, the communications device is adapted to be body-worn. In an embodiment, the second coil (or at least a part of it) has the form of a neck strap adapted to be worn around the neck of a person. In an embodiment, the neck strap comprising the second coil is adapted to communicate with a hearing aid or another head-worn device. Thereby, the second part of the communications device serves the combined function of improving the communication between the communications device and the other device AND that of providing an arrangement for wearing the communications device on the body of a person.

In an embodiment, the effective length of the second induction coil can be modified to adapt it to a particular size and constitution of a person wearing it. Thereby a microphone of the first part of the communications device can be positioned properly in relation to a wearers' mouth, when the second induction coil is worn as a neck loop. Such regulation can be achieved by simply making a knot on the neck loop to adjust the length of the loop around the neck. Alternatively a regulation piece, e.g. a piece that closes off a part of the loop length and which can be moved along the loop to divide the loop in two parts one of which (the one to which the first part is attached) is taken over the head of the wearer. In an embodiment, an attachment member of the second part is adapted to allow such regulation of the length of the loop part that is to be hanged around the neck.

In an embodiment, the second coil comprises a safety mechanism or unit adapted to break or release at a predefined tensile load (e.g. corresponding to a few kg load, e.g. 5 kg or 10 kg) to minimize damage to the wearer in case of an accident when the second coil is used as a neck strap. In an embodiment, the safety mechanism is recoverable in the sense that it can be joined again after a release. In an embodiment, the safety mechanism comprises two parts that are adapted to connectingly engage with each other and are adapted to break or release at a predefined tensile load, such as corresponding to a few kg of load. In an embodiment, the safety mechanism comprises a pair of cooperating electrical conductors, e.g. in the form of an electrical connector, connecting the two parts of the induction loop (the electrical connector e.g. being implemented as corresponding male and female connectors). In an embodiment, the safety mechanism comprises two parts adapted to separate at a predefined tensile load. In an embodiment the wires constituting the second coil comprise a section that is deliberately made mechanically weak and which break at a tensile load smaller than what is necessary for releasing or breaking the two parts of the safety mechanism. In an embodiment, the safety mechanism comprises a printed circuit board (PCB) whereon the wire(s) of the second antenna are formed over a short length, e.g. of the order of 1 or 2 cm or less, the PCB comprises a part that is mechanically weak, e.g. by being relatively narrow and adapted to break at a predefined tensile load. In an embodiment, the PCB of the safety mechanism contains electronic components (e.g. a resistor and/or a capacitor) for tuning the inductive circuit to a predefined frequency range.

In an aspect, use of a communications device as described above, in the detailed description and in the claims is provided.

In an aspect, a hearing aid system is provided, the system comprising a communications device as described above, in the detailed description and in the claims and another device, wherein the other device is adapted to communicate inductively with the communications device. In an embodiment, the other device is a head-worn listening device, such as a hearing aid (or a pair of hearing aids) or a head set or a pair of headphones.

In an aspect, a second part of a communications device comprising a second induction coil adapted to be inductively coupled to a first induction coil of a first part of a communications device and to another device, when mounted on or near a first housing of the first part, is provided, wherein the second part is adapted to be detachably attachable to the first housing.

In an embodiment, the second induction coil (or at least a part of it) has the form of a neck strap adapted to be worn around the neck of a person. In an embodiment, the neck strap comprising the second coil is adapted to communicate with another device in the form of a hearing aid or another head-worn device. Thereby, the second part serves the combined function of improving the communication between the communications device and the other device AND that of providing an arrangement for wearing the communications device on the body of a person.

In an embodiment, the mutual induction between the first and second induction coils can be modified by modifying the length of the part of the second induction coil located near the housing of the first part, when the second part is mounted on the first part. In an embodiment, the communications device is adapted to allow an adjustable change of length of a part of the second induction coil intended for being worn around the neck, thereby facilitating the adjustment of the position of a microphone on the communications device relative to a wearer's mouth dependent upon the size of the person.

In an embodiment, the other device is a head-worn listening device, such as a hearing aid (or a pair of hearing aids) or a head set or a pair of headphones. In an embodiment, the first part comprises a portable communications device, such as a mobile telephone, such as a DECT-telephone or such as a telephone connected to a switched telecommunications network, e.g. a GSM-telephone. In an embodiment, the first part comprises an audio selection device in the form of a portable, body-worn communications device for wireless audio and data transmission to another device in the form of a head-worn listening device, e.g. a hearing aid.

In an aspect, a body-worn communications device adapted for inductively communicating with another device and comprising a first part and a second part as described above, in the detailed description and in the claims is furthermore provided.

Further objects of the disclosure are achieved by the embodiments defined in the dependent claims and in the detailed description of the preferred embodiments.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

BRIEF DESCRIPTION OF DRAWINGS

The disclosure will be explained more fully below in connection with a preferred embodiment and with reference to the drawings in which:

FIG. 2 shows an embodiment of a communications device according to the disclosure, FIG. 2a illustrating a second part of a communications device in the form of an inductance loop and an attachment member to which at least a part of the inductance loop is attached and FIG. 2b illustrating a first part a communications device comprising a first induction coil with a ferrite core adapted for inductively communicating with another device, and FIG. 2c illustrating the second part (cf.

The figures are schematic and simplified for clarity, and they just show details which are essential to the understanding of the disclosure, while other details are left out. Throughout, the same reference numerals are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

DETAILED DESCRIPTION OF THE PREFERRED EMBODIMENTS

Figures 1A, 1B:
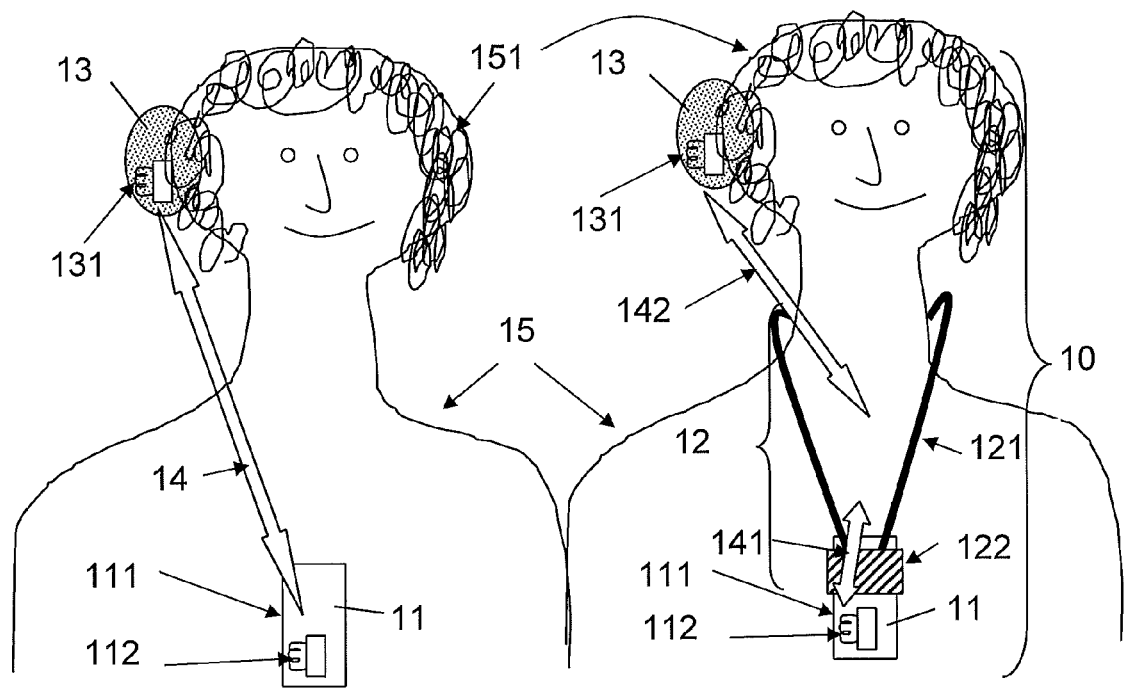
FIG. 1 shows an embodiment of a body-worn hearing aid system according to the present disclosure, FIG. 1a illustrating a situation where a first part of a communications device communicates inductively with a head-worn listening device, and FIG. 1b illustrating a situation where a first part of a communications device communicates inductively with a head-worn listening device via an intermediate, second part of a communications device in the form of an inductance loop.

FIG. 1 shows an embodiment of a body-worn hearing aid system 10 according to the present disclosure. FIG. 1a shows a first part 11 of a communications device worn on the body of a person 15, inductively communicating 14 with a listening device 13 worn on the head 151 of the person 15. The listening device 13 (here schematically shown as a hearing aid) comprises an induction coil 131 for inductive communication 14 with the first induction coil 112 of the first part 11 of the communications device, the first induction coil 112 being enclosed in the housing 111 of the first part 11. FIG. 1b shows a situation where the first part 11 of the communications device communicates inductively with the head-worn listening device 13 via an intermediate, second part 12 of a communications device in the form of an inductance loop 121 and an attachment member 122. FIG. 1b shows the same part as FIG. 1a, except that the inductive communication between coil 112 of the first part 11 and coil 131 of the other device 13 is adapted to be via the inductance loop 121 of the second part 12. In other words, coil 112 of the first part 11 is inductively coupled 141 to inductance loop 121 of the second part 12, which is inductively coupled 142 to coil 131 of the other device 13. The communications device 11, 12 comprises first part 11 and second part 12, where second part 12 is mounted on the housing 111 of the first part, here in that the attachment member 122 is detachably attached to the housing 111 in such a way that the second induction coil 121 is inductively coupled to the first induction coil 112 when the attachment member 122 is mounted on the housing 111. The attachment member 122 can e.g. comprise a string or an elastic member, e.g. an elastic tape or band, or tapes of cooperating hook and loop fasteners. In the present embodiment, the 'neck-loop antenna' 121 serves the combined function of improving the communication 141, 142 between the communications device 11, 12 and the other device 13 AND that of providing an arrangement for wearing the (first part 11 of) communications device on the body of the person 15.

Figures 2A, 2B, 2C:
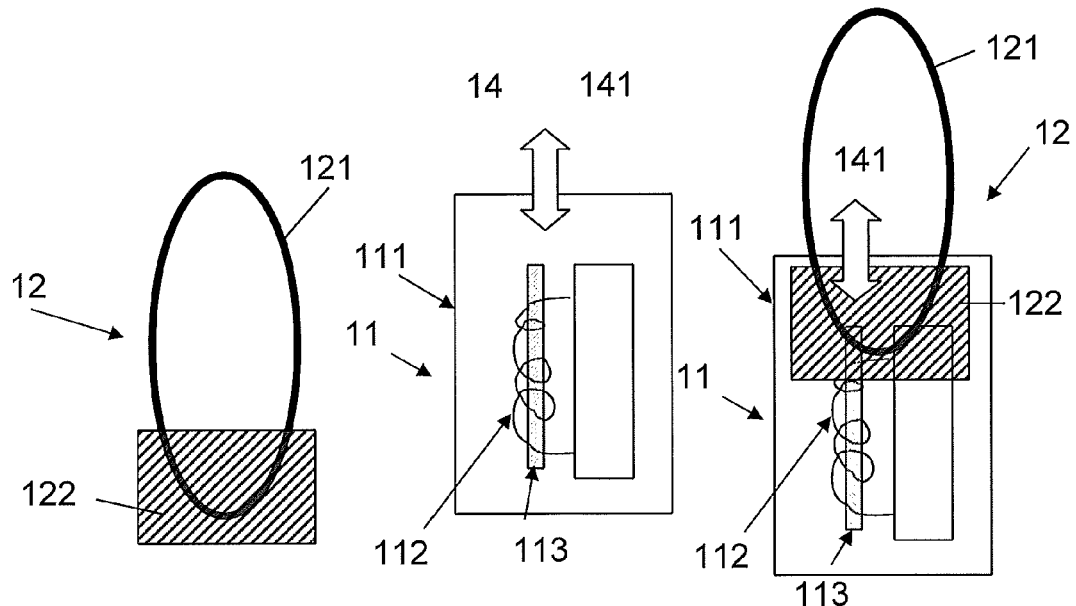
FIG. 2a) mounted on the first part (cf.
FIG. 2b)

FIG. 2 shows an embodiment of a communications device according to the disclosure. FIG. 2*a* shows a second part 12 of a communications device in the form of an inductance loop 121 and an attachment member 122 to which at least a part of the inductance loop 121 is attached. FIG. 2*b* shows a first part 11 of a communications device comprising a first induction coil 112 with a ferrite core 113 adapted for inductively communicating 14, 141 (cf. FIG. 1) with another device (e.g. hearing aid 13 in FIG. 1). FIG. 2*c* shows the second part 12 (of FIG. 2*a*) mounted on the first part 11 (of FIG. 2*b*). The attachment member 122 of the second part 12 (to which the induction loop 121 is attached, e.g. fixed or alternatively detachably) is detachably attached to the housing 111 of the first part 11. Attachment member 122 is further described in connection with FIGS. 3 and 4 below. As schematically illustrated in FIG. 2*c* the inductance loop 121 is (via the location of attachment member 122) positioned relative to the magnetic field 141 of first inductance coil 112 (amplified by a core 113 of a soft magnetic material) to provide an inductive coupling between the two coils 112, 121 (in that a substantial part of the magnetic flux lines from the first induction coil is enclosed by the second induction coil 121).

FIG. 3 shows a first embodiment of a second part of a communications device according to the disclosure. FIG. 3*a* shows a perspective view of an embodiment of an attachment member 122 comprising two protruding gripping members 1221 adapted to provide a detachable attachment to opposing sides of a housing of a first part of a communications device. The attachment member 122 further has inlet and outlet holes for induction loop 121 (induction loop only partly shown). The electrical conductor(s) of the induction loop 121 is/are routed in the attachment member to provide a good inductive coupling to a first induction coil, when the attachment member is attached to the housing of the first part of a communications device. FIG. 3*b* shows a front view and FIG. 3*c* shows a side view of the attachment member 122 (including a part of the induction coil 121 attached to the attachment member) with gripping members 1221. FIG. 3*d* is a top view of the attachment member 122 with gripping members 1221. In this view, protrusions 1222 (here) located at each end of gripping members 1221 adapted to cooperate with corresponding indentations in (opposite sides of) a housing to allow a 'click-on' fastening of the attachment member to the housing (cf. housing 111 of first part 11 in FIG. 3*j*) are visible. The construction allows the attachment member to be relatively easily twisted off the housing without damage to either of the attachment member or housing. In an embodiment, the attachment member (or at least the gripping members) is made of a plastic material having appropriate mechanical properties in respect of one or more of flexibility, rigidity, toughness, impact resistance, heat resistance and processing/production parameters. In an embodiment, the attachment member comprises PC/ABS (a PolyCarbonate, Acrylonitrile Butadiene Styrene "blend"). Preferably the geometries of the housing of the first part and the attachment member are adapted to each other, thereby creating a geometric lock between them. In an embodiment, the attachment member is resilient or comprises a resilient part.

Figure 3E:
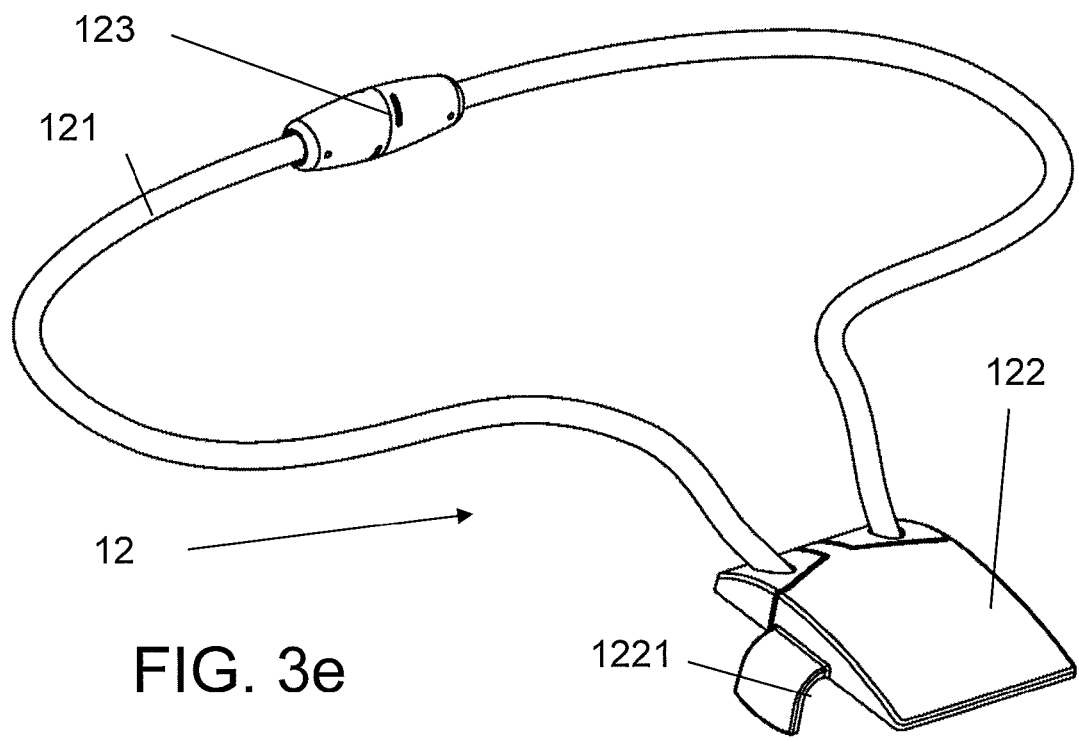
FIG. 3 shows a first embodiment of a second part of a communications device according to the disclosure.
Figure 3F:
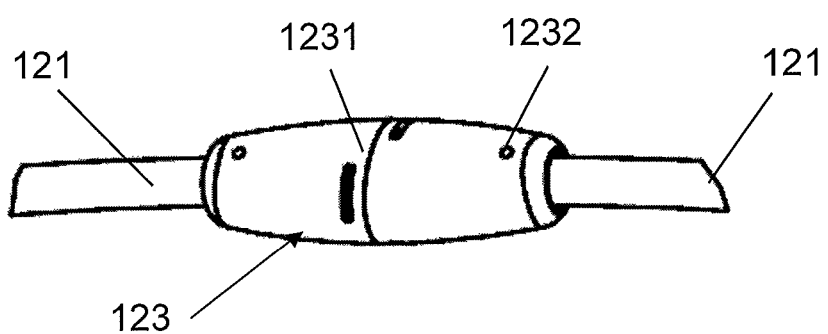
Figure 3G:
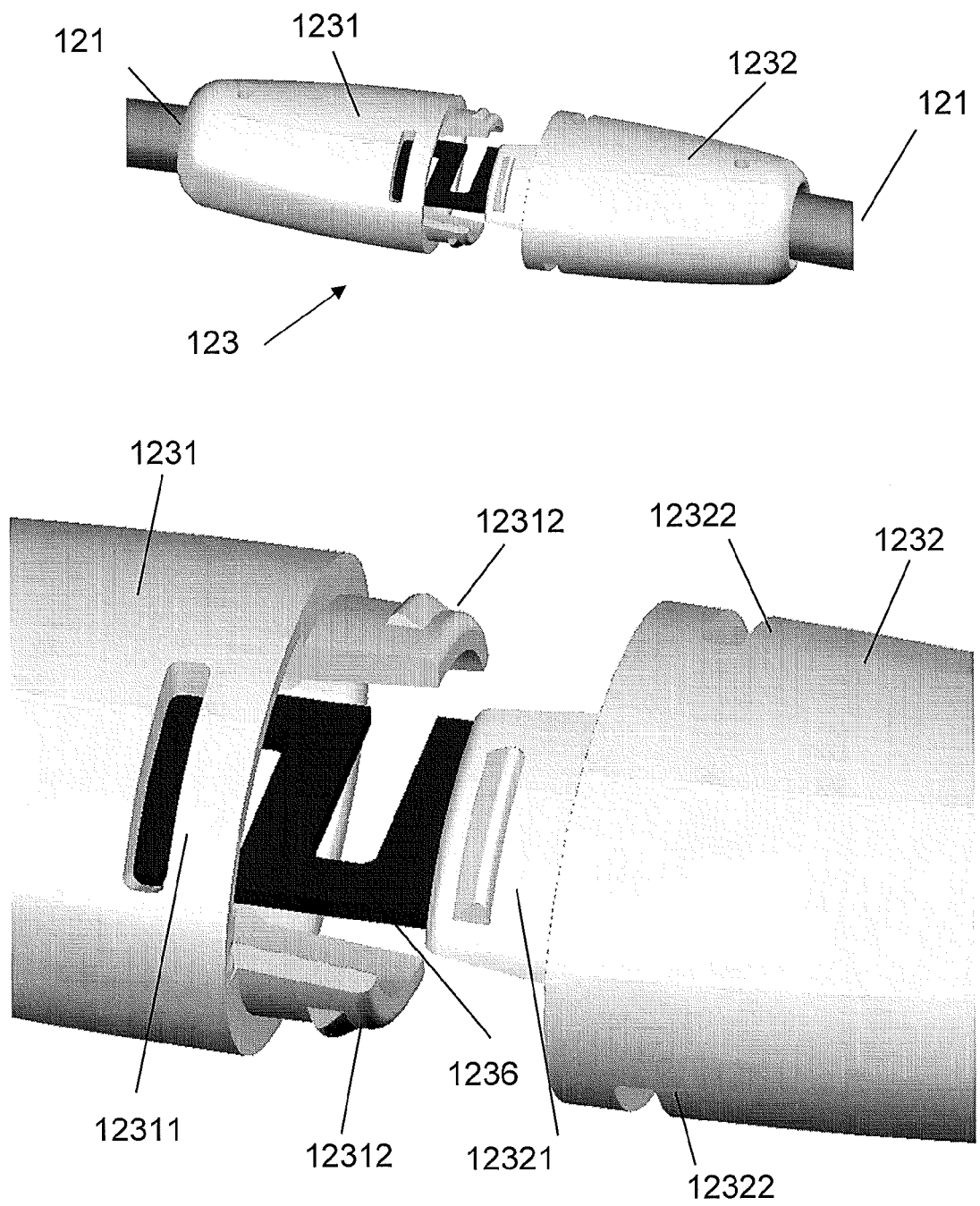
Figure 3H:
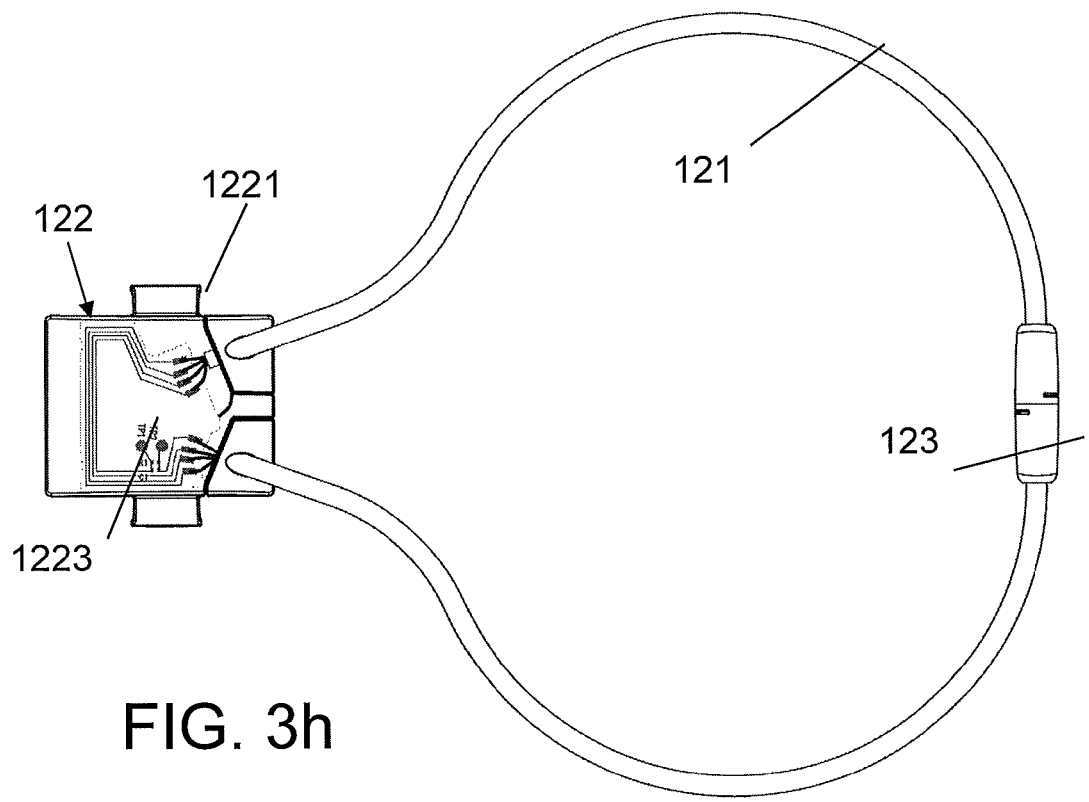
Figure 3I:
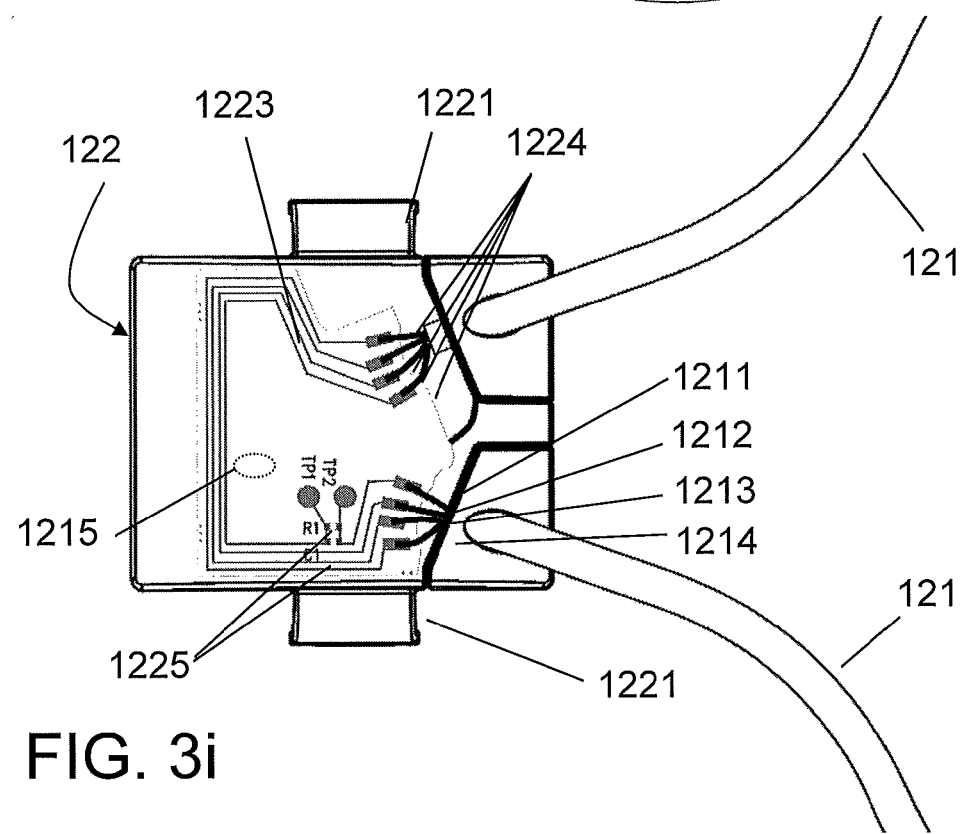
Figure 3J:
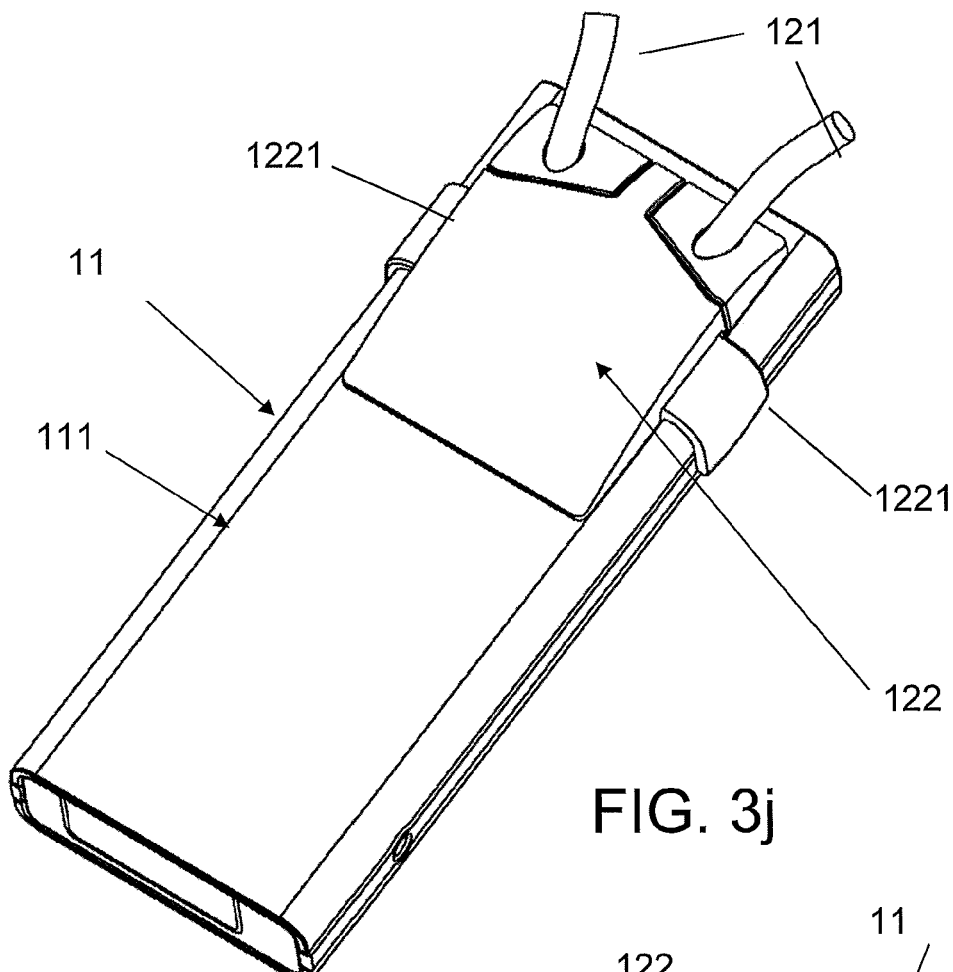
Figure 3K:
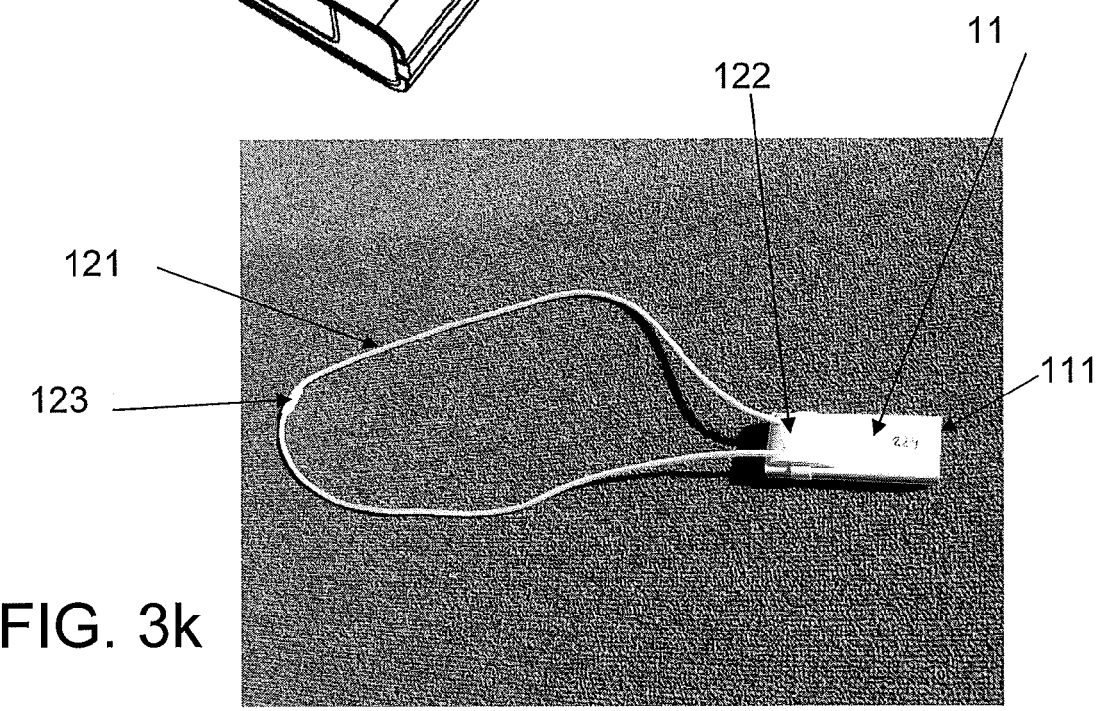
Figure 4A:
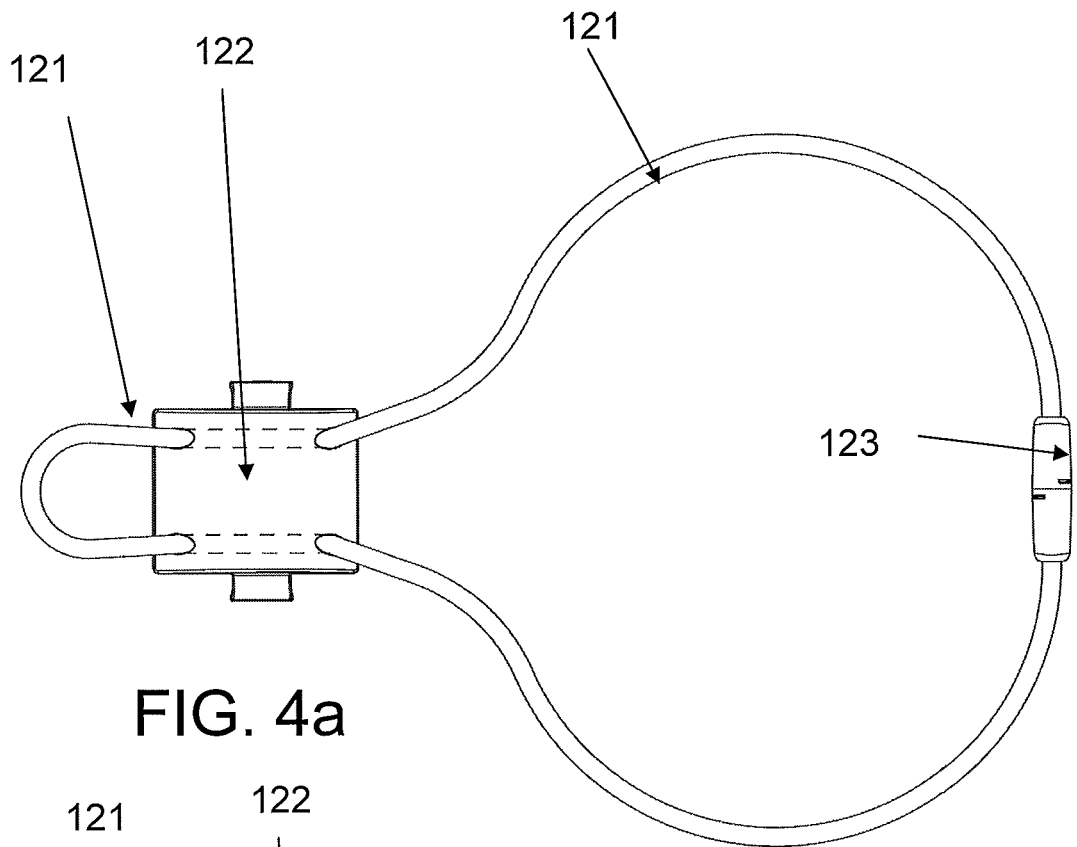
FIG. 4 shows a second embodiment of a second part of a communications device according to the disclosure.
Figure 4B:
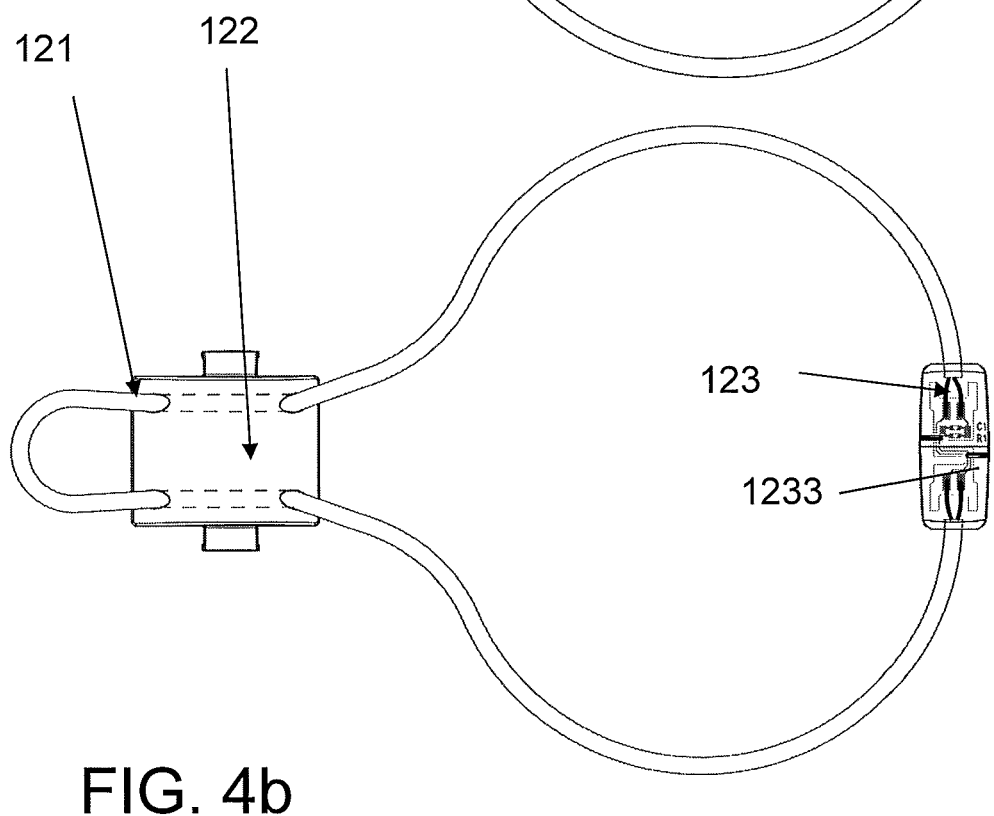
Figure 4C:
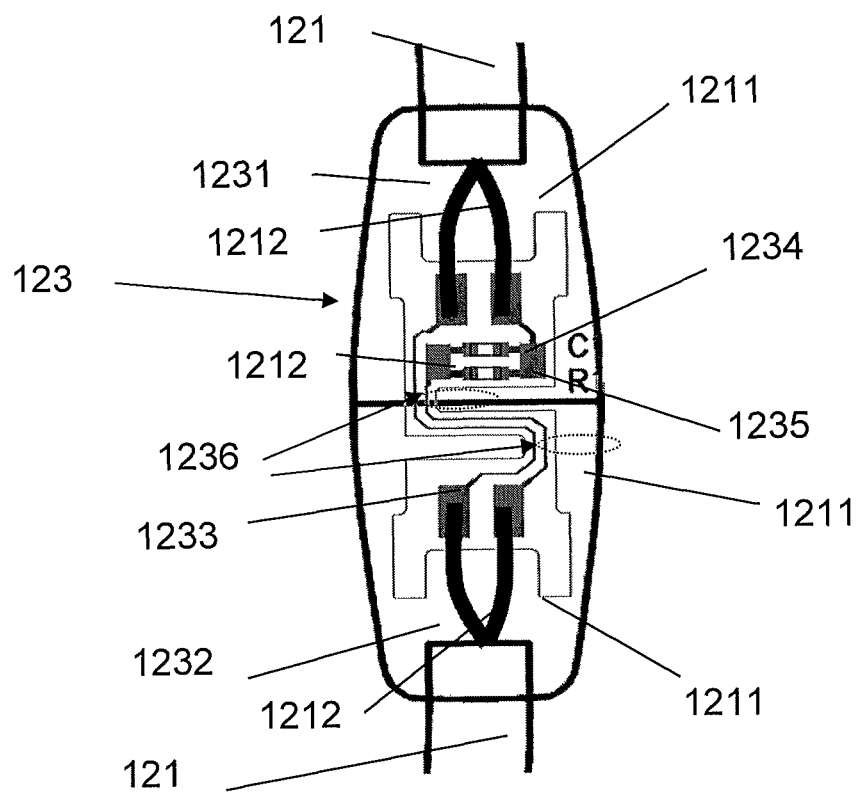
Figure 4D:
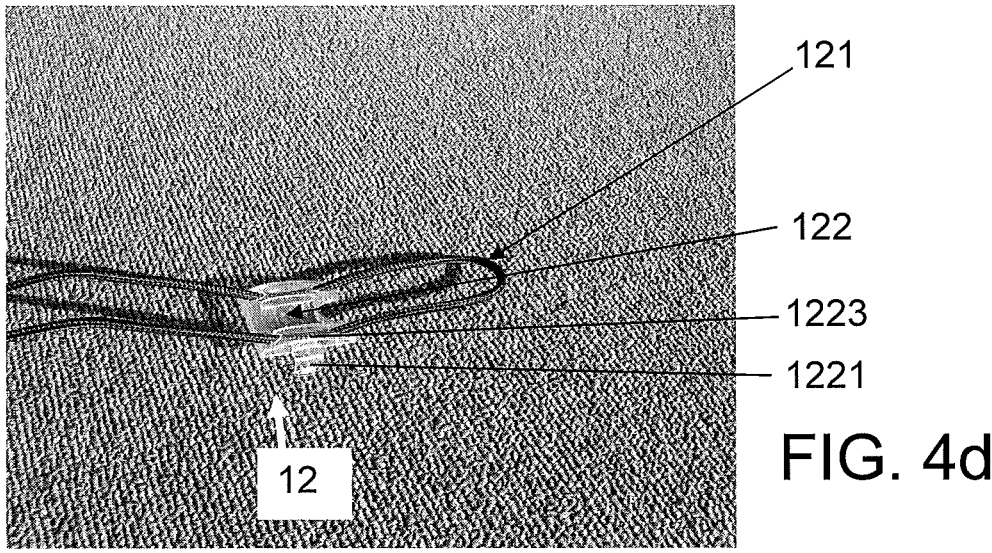
Figure 4E:
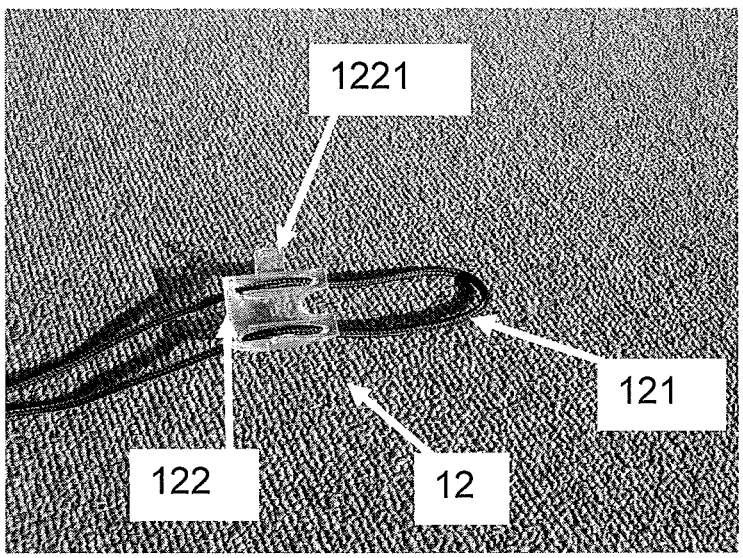
Figure 4F:
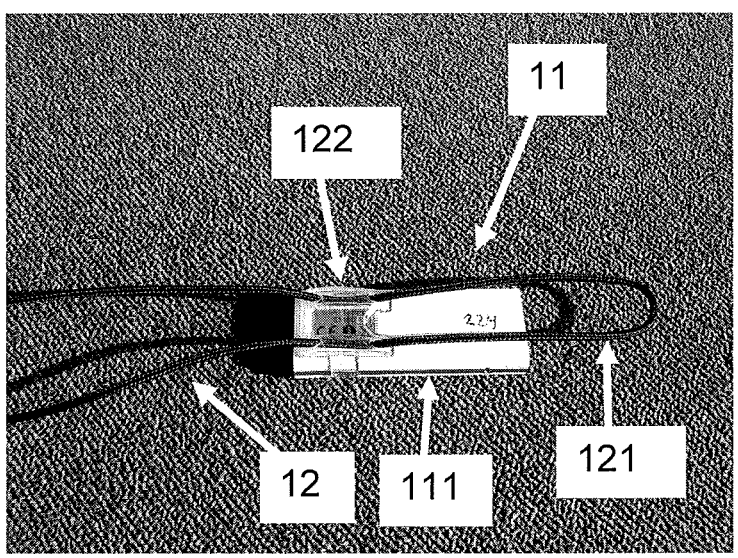

FIG. 3*e* shows an embodiment of the second part 12 of the communications device in full. The part of the induction loop 121 not covered by the attachment member 122 is visible. The induction loop comprises a safety member 123 adapted to provide that the loop breaks mechanically, in case of a tensile load larger than a predefined value, to avoid damage to a wearer of the induction loop in case the loop—by accident—is exposed to a large tensile force. FIG. 3*f* shows a closer view of an embodiment of a safety member 123 comprising 2 parts (here halves) 1231, 1232, here plastic parts enclosing the conductor(s) of the induction loop. In general, the electrical conductors of the induction loop 121 are embedded in a jacket of an electrically insulating material, e.g. a plastic material. Typically, an induction loop for being used as a neck strap has a length adapted to this purpose (child, grown up, large, medium, small, i.e. to ensure that it can be easily taken over the head of a person), e.g. having a length between 50 cm and 150 cm, e.g. in the range from 75 cm to 125 cm. In the safety member 123 (and/or possibly in the attachment member 122) the insulating jacket may be removed to weaken the tensile strength of the induction loop over a certain length of the loop (and/or to route the conductor(s) to a tuning circuit comprising electronic components). FIG. 3*g* shows an embodiment of the safety member 123, comprising two cooperating parts 1231, 1232, each comprising two protruding members 12312, 12321, adapted to releasably engage with corresponding indentations 12311, 12322 (protrusions 12312 of first safety part 1231 adapted to click into indentations 12322 of second safety part 12322 and protrusions 12321 of second safety part 1232 adapted to click into indentations 12311 of first safety part 1231). The top part of FIG. 3*g* shows the full safety unit 123 (partially disengaged to illustrate the locking mechanism) and the bottom part focusing on the locking mechanism between the two parts of the safety unit 123. The first and second parts 1231, 1232 of safety member 123 are adapted to disengage (without being damaged) at a predefined tensile load (e.g. larger than 5 kg or larger than 10 kg). Here the conductors of the induction loop are routed on a printed circuit board comprising a weak (narrow) section 1236. Over a relatively small length, the PCB is weakened (here by routing the conductors over a relatively narrow (small width) part of the PCB) to enable mechanical failure at a predefined tensile load smaller than that of the first and second safety parts 1231, 1232. As an alternative to the PCB, the wire(s) of the second induction loop can be joined by a connector, thereby providing a safety mechanism that is recoverable after a release (i.e. can be joined again). In an embodiment, the connector constitutes the safety mechanism (cf. e.g. FIG. 6). FIG. 3*h* shows an embodiment of the second part, where the upper enclosure of the attachment member 122 is omitted, so that a PCB 1223, whereon the conductor(s) (cf. 1215 of close-up in FIG. 3*i*) of the loop coil 121 are routed, can be viewed. FIG. 3*i* shows a close-up of the attachment member 122 in a cross section displaying the PCB 1223. Here, the induction coil 121 comprises four electrical conductors 1211, 1212, 1213, 1214, which are terminated (on entering and exiting the attachment member 122) in termination pads 1224. The conductors 1215 are routed on the PCB between inlet and outlet pads and connected to a tuning circuit comprising one or more electronic components 1225 (here in the form of resistors and capacitors) to tune the resonance frequency of the loop to a predefined frequency range. FIG. 3*j* illustrates an embodiment of a communications device according to the disclosure comprising a first part 11 with a housing 111 where an attachment member 122 of a second part (comprising second induction coil 121, partly shown) is detachably attached to the housing 11 via gripping members 1221, which engage with cooperating members formed on each side of the housing 111. FIG. 3*k* shows a full perspective view of a communications device according to an embodiment of the disclosure. In an embodiment, the second part can be moved along the length of the housing 111 of the first part 11 (here) by sliding attachment member 122 along the housing from one end to the other or by making a number of cooperating members along the length of the housing for engaging with gripping members 1221, thereby allowing a modification of the loop to adapt the position of the first part relative to a wearers head when carried around the neck. In this case the corresponding gripping means of housing 111 are preferably adapted to allow such sliding. In an embodiment, the housing 111 of the first part comprises grips at one end of the housing to allow attachment of opposing 'sides' of the induction loop to the housing, when attachment member 122 is slid towards the other end of the housing, thereby controlling the form of that part of the loop available for having around the neck (and thus the location of a microphone e.g. located in the top part of the first part relative to a wearers' mouth).

FIG. 4 shows a second embodiment of a second part of a communications device according to the disclosure providing easy adjustment of the length of the part of the second induction coil intended to be worn around the neck of a person. In this embodiment, as shown in FIG. 4*a*, the attachment member 122 comprises a planar part with four holes for fixing the induction loop by simply routing an end of the loop (before attachment to the safety unit 123) through a first hole from a first side to a second side of the planar part of the attachment member and then through the second hole from the second side to the first side of the planar part and so on. FIG. 4*b* shows the second part 12 with a cross section of the safety member 123 where a printed circuit board 1233, whereon the electrical conductors of the induction loop are routed, is visible. FIG. 4*c* shows details of the safety unit 123 comprising PCB 1233 whereon the electrical conductors (here two) 1211, 1212 of the induction loop are terminated and routed (looped through). Here, the conductors 1211, 1212 on the PCB are connected to a tuning circuit comprising a capacitor 1234 and a resistor 1235 in parallel. As illustrated by dotted ellipses 1236, the PCB comprises narrow parts adapted to mechanically fail when subject to a predefined tensile load. The safety unit comprises two enclosing parts 1231, 1232 (e.g. of made of a plastic material) for protecting the PCB and the safety arrangement. Enclosing parts 1231, 1232 may e.g. be embodied as first and second safety parts as shown in FIG. 3*g*. FIGS. 4*d* and 4*e* show perspective top and bottom view photos of an embodiment of a second part 12 according to the disclosure comprising second induction coil 121 (only partly shown) and attachment member 122. Protruding gripping members 1221 for detachably attaching the attachment member 122 to the housing of a first part (cf. FIG. 4*f*) are shown together with planar part 1223 comprising holes for attaching the induction loop 121 to the attachment member 122. FIG. 4*f* illustrates a full perspective view of an embodiment of a communications device according to the disclosure, where a second part 12 is attached to a first part 11 in that attachment member 122 of the second part is detachably attached to housing 111 of the first part of the communications device. As illustrated (cf. difference between FIG. 4*e* and FIG. 4*f*), a part of the second induction coil 121 can be modified in length and form on or near the housing 111 of the first part 11 to modify the length of the part of the loop being available for taking over the head and/or for modifying the mutual induction between the first and second coils, the first coil of the first part e.g. being located along one of the long sides of the housing 111 of the first part 11 (cf. e.g. FIG. 2). In the simple construction of FIG. 4, the distribution of the loop between the two sides of the attachment member 122 can simply be modified by drawing the second induction loop through the holes of the attachment member 122, thereby e.g. providing a larger or smaller part of the loop to be available for being carried around the neck and thus adapted according to the size of the wearer.

Figures 5A, 5B, 5C:
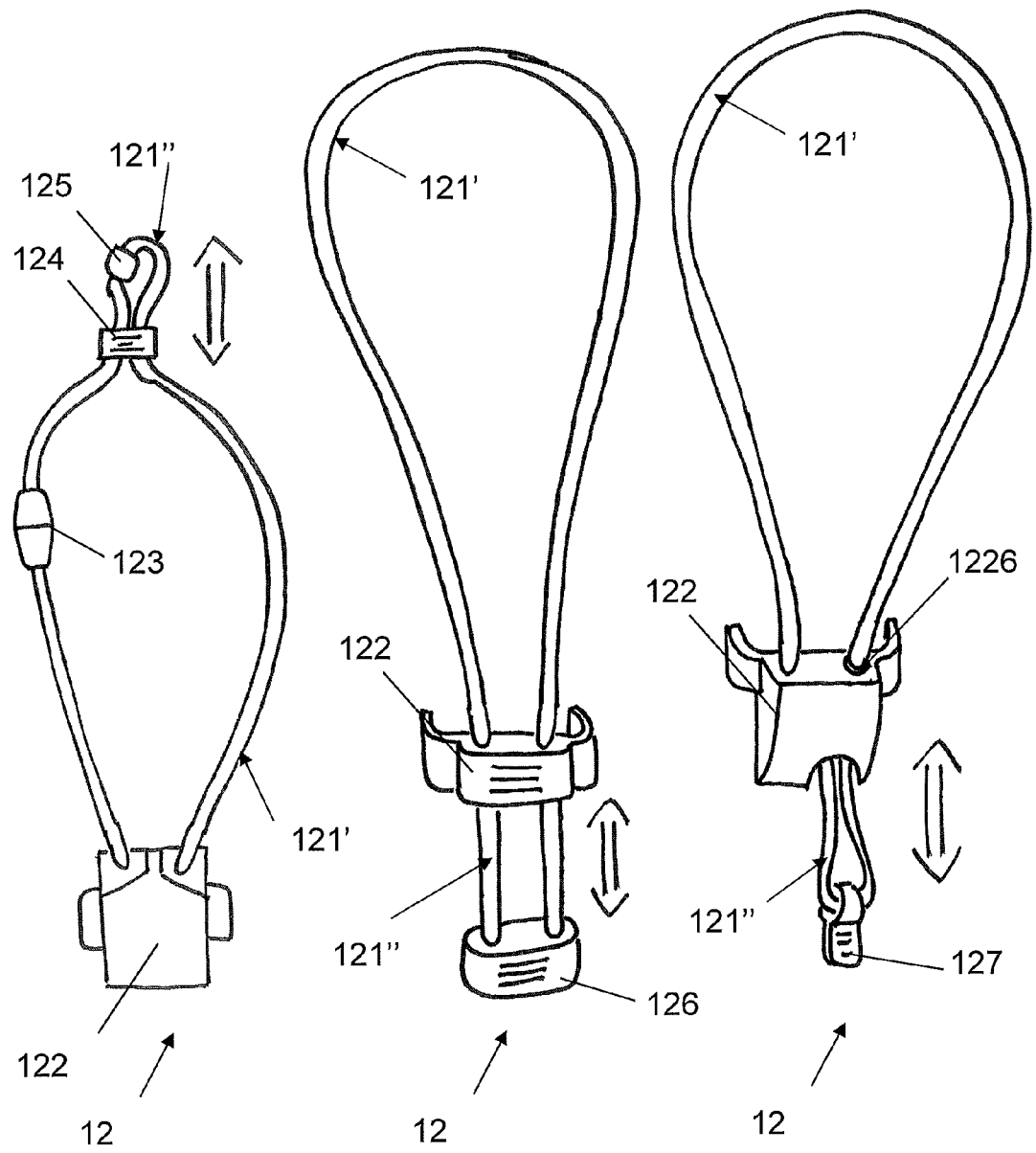
FIG. 5 shows various embodiments of a second part of a communications device according to the disclosure providing loop length adjustment.

FIG. 5 shows various embodiments of a second part 12 of a communications device according to the present disclosure for modifying the length of the part 121' of the loop coil determining the position of the first part 11 of a communications device (e.g. comprising a microphone, cf. 114 in FIG. 8) relative to a wearers head (when the relevant part of the loop coil is mounted around the neck of the wearer, cf. e.g. FIG. 1*b*). The loop coil of FIG. 5*a* comprises a length regulating member 124 (e.g. of a plastic material) comprising one or two holes through which the loop coil is led, thereby providing a regulating mechanism for dividing the loop in two parts 121', 121", one (the primary part) 121' comprising an attachment member 122 (or the part of the second induction loop adapted for being attached to a first part 11 of a communications device) for being taken over the head, the other 121" for just hanging loose. A blocking member 125 is shown with the purpose of avoiding that the length regulating member slides off the induction loop in the case that it contains only one hole, instead of two. FIG. 5*b* illustrates an embodiment, where the length regulating mechanism, comprising two holes through which the induction loop is led, is a part of attachment member 122, the joining part 126 possibly comprising a tuning circuit and/or a safety mechanism. In the embodiment in FIG. 5*c*, the attachment member 122 comprises a hole 1226 through which the loop coil can be drawn to either side thereby modifying the relative sizes of the two loop parts 121', 121". The second part 12 further comprises a drawing member 127 for facilitating the rearrangement of the relative sizes of the two parts 121', 121" of the loop coil.

Figures 6, 7:
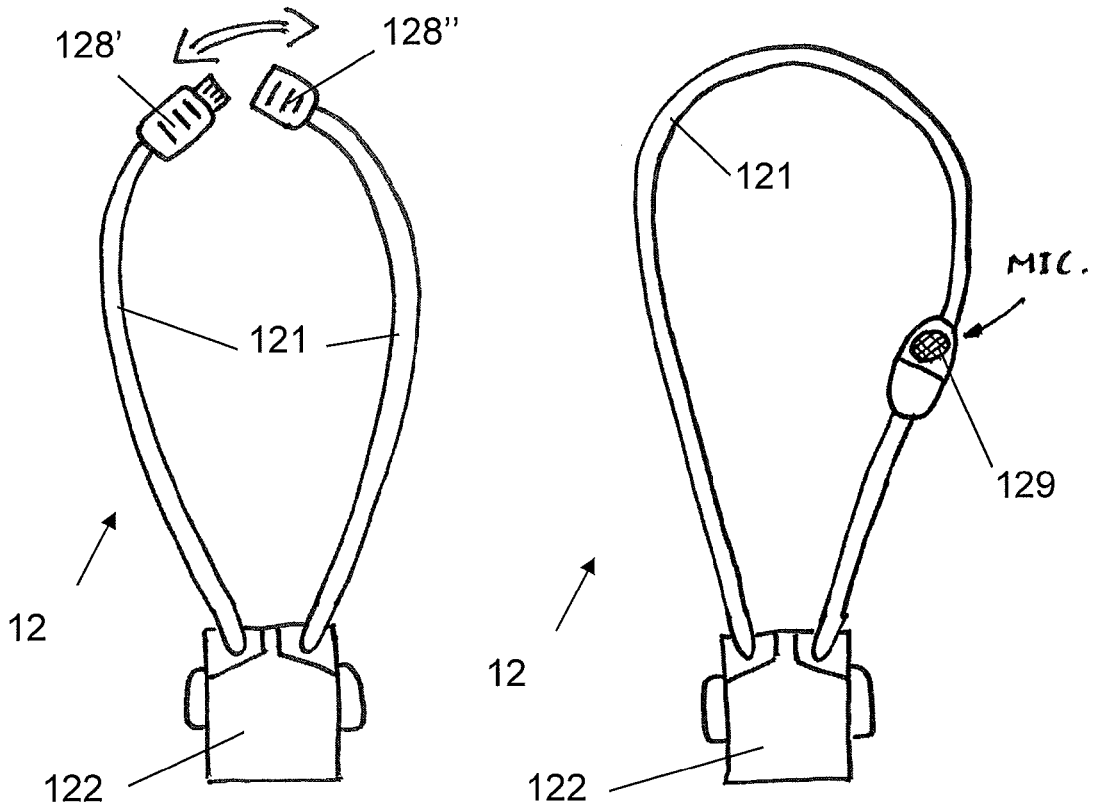
FIG. 6 shows an embodiment of a second part of a communications device according to the disclosure comprising a pair of electrical connectors in the second induction coil.
FIG. 7 shows an embodiment of a second part of a communications device according to the disclosure comprising a microphone.

FIG. 6 illustrates a second part 12 of a communications device according to the present disclosure comprising an electrical connector (comprising matching male and female connector parts 128', 128", respectively) for electrically closing the loop of the second induction coil. In an embodiment, the electrical connector 128', 128" is adapted to provide a security mechanism, which releases when subject to a predetermined tensile load.

FIG. 7 shows an embodiment of a second part 12 of a communications device according to the present disclosure comprising a microphone 129, here located appropriately on the induction loop 121 relative to a wearer's head (when worn around the neck). Alternatively a microphone may be located in connection with an attachment member 122. In an embodiment, the microphone 129 is wirelessly connected with the first part of the communications device.

Figure 8:
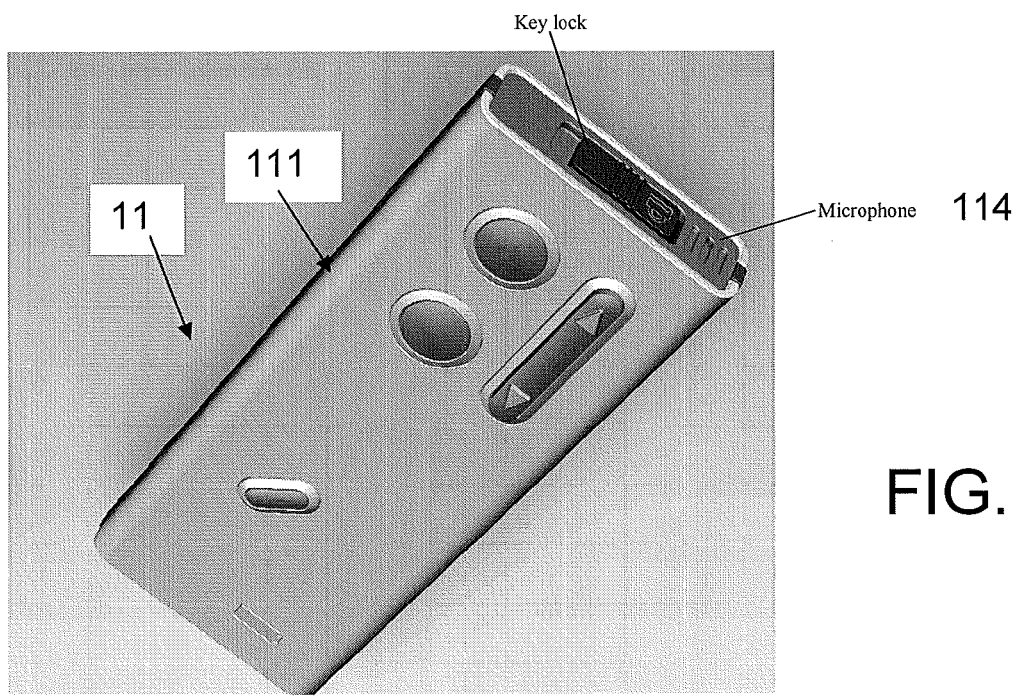
FIG. 8 shows an embodiment of a first part of a communications device according to the disclosure comprising a microphone.

FIG. 8 shows an embodiment of a first part 11 of a communications device according to the disclosure comprising a microphone 114 at one end of the housing 111 of the first part, preferably on the end of the first part intended to be closest to a wearers' mouth for picking up the voice of the wearer, cf. e.g. FIG. 1*b*.

Embodiments of the disclosure defined by the features of the independent claim(s). Preferred embodiments are defined in the dependent claims. Any reference numerals in the claims are intended to be non-limiting for their scope.

Some preferred embodiments have been shown in the foregoing, but it should be stressed that the disclosure is not limited to these, but may be embodied in other ways within the subject-matter defined in the following claims.

References

EP 1 480 492 A2 (SIEMENS AUDIOLOGISCHE TECHNIK) 24 Nov. 2004
US 2006/0039577 A1 (J. Sanguino et al.) 23 Feb. 2006
EP 0 789 474 A2 (NOKIA MOBILE PHONES) 13 Aug. 1997
US 2004/240692 (JULSTROM) 2 Dec. 2004
US 2005/0244022 (MOTOROLA) 3 Nov. 2005
EP 1 460 769 A1 (PHONAK) 22 Sep. 2004
WO 2006/117365 A1 (OTICON) 9 Nov. 2006

WO 2005/055654 (STARKEY LABORATORIES, OTICON) 16 Jun. 2005
WO 2005/053179 (STARKEY LABORATORIES, OTICON) 9 Jun. 2005

The invention claimed is:

1. A communications device for wireless communication with another device, the communications device comprising a) a first part comprising a first housing and a first inductive coil for providing an inductive coupling to, and adapted to communicate inductively with a third inductive coil in the other device, and b) a second part comprising a second inductive coil adapted to be inductively coupled to said first inductive coil and to said other device when mounted on or near said first housing, wherein said second part is adapted to be detachably attachable to said first housing, wherein the second inductive coil has the form of a neck strap adapted to be worn around the neck of a person, wherein the first and second parts are distinct, separate parts that only cooperate electromagnetically via the inductive connection between them, wherein the first part has a transmission range for communication with the other device, wherein the second device enhances the transmission range of the first device.

2. A communications device according to claim 1 wherein the first part is adapted to communicate directly with the other device without involving the second part, in case of sufficient coupling between the first inductive coil and the other device.

3. A communications device according to claim 1 wherein the first inductive coil is specifically adapted to provide direct inductive communication with the other device.

4. A communications device according to claim 1 adapted to provide that the mutual induction between the first and second inductive coils is adjustable.

5. A communications device according to claim 1 wherein the second part is attached to said first housing by any one of the means selected from the group consisting of a string, an elastic member, one or more tapes of cooperating hook and loop fasteners, and combinations thereof.

6. A communications device according to claim 1 wherein detachment is dependent on an activator.

7. A communications device according to claim 1 wherein the first part comprises a portable communications device.

8. A communications device according to claim 1 wherein the first part comprises an audio selection device in the form of a portable, body-worn communications device for wireless audio and data transmission to a head-worn listening device.

9. A communications device according to claim 1 wherein the second inductive coil is in the form of a closed loop comprising one or more turns.

10. A communications device according to claim 1 wherein the inductive coupling between the communications device and the other device is optimized to a predefined frequency range for the inductive communication.

11. A communications device according to claim 1 wherein the second part comprises a tuning circuit for the second inductive coil in the form of a resistor and/or a capacitor.

12. A communications device according to claim 11 wherein the attachment member comprises a printed circuit board with at least some of the tuning component(s).

13. A communications device according to claim 1 wherein the second coil comprises a safety mechanism adapted to break or recoverably release at a predefined tensile load to minimize damage to the wearer in case of an accident when the second coil is used as a neck strap.

14. A communications device according to claim 1 wherein the wire or wires constituting the second coil comprise a section that is deliberately made mechanically weak as a safety mechanism.

15. A communications device according to claim 1 wherein the safety mechanism comprises two parts that are adapted to connectingly engage with each other and are adapted to break or release at a predefined tensile load.

16. A communications device according to claim 15 wherein the safety mechanism comprises a pair of cooperating electrical conductors.

17. A communications device according to claim 1 wherein the second part comprises a regulation piece to provide that the length of the part of the second inductive coil adapted to be worn around the neck of a person can be reversibly modified.

18. A hearing aid system comprising a communications device according to claim 1 and another device, wherein the other device is adapted to communicate inductively with the communications device.

19. A hearing aid system according to claim 18 wherein the other device is a head-worn listening device.

20. second part of a communications device comprising a second inductive coil adapted to be inductively coupled to a first inductive coil of a first part of a communications device and to a third inductive coil of another device when mounted on or near a first housing of the first part wherein said second part is adapted to be detachably attachable to said first housing, wherein the second inductive coil has the form of a neck strap adapted to be worn around the neck of a person, wherein the first and second parts are distinct, separate parts that only cooperate electromagnetically via the inductive connection between them.

21. A second part of a communications device according to claim 20 wherein the length of the part of the second inductive coil adapted to be worn around the neck of a person can be reversibly modified.

22. A second part of a communications device according to claim 20 wherein the first part comprises a portable communications device.

23. A second part of a communications device according to claim 20 wherein the first part comprises an audio selection device in the form of a portable, body-worn communications device for wireless audio and data transmission to a head-worn listening device.

* * * * *